US011280450B2

(12) United States Patent
Yumuk

(10) Patent No.: US 11,280,450 B2
(45) Date of Patent: Mar. 22, 2022

(54) ACCESS PROTECTION SYSTEM FOR SAFEGUARDING A MACHINE OR INSTALLATION

(71) Applicant: PILZ GMBH & CO. KG, Ostfildern (DE)

(72) Inventor: Sezgin Yumuk, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 104 days.

(21) Appl. No.: 16/773,928

(22) Filed: Jan. 27, 2020

(65) Prior Publication Data

US 2020/0263828 A1    Aug. 20, 2020

(30) Foreign Application Priority Data

Jan. 28, 2019  (DE) ............... 10 2019 102 004.2

(51) Int. Cl.
| | |
|---|---|
| *F16P 3/14* | (2006.01) |
| *F16P 3/08* | (2006.01) |
| *G01V 8/20* | (2006.01) |
| *B30B 15/28* | (2006.01) |

(52) U.S. Cl.
CPC ............ *F16P 3/144* (2013.01); *B30B 15/285* (2013.01); *F16P 3/08* (2013.01); *F16P 3/147* (2013.01); *G01V 8/20* (2013.01)

(58) Field of Classification Search
CPC ... F16P 3/144; F16P 3/147; F16P 3/08; B30B 15/285; G01V 8/20; E05B 45/06; E05B 49/006
See application file for complete search history.

(56) References Cited

U.S. PATENT DOCUMENTS

| | | | | |
|---|---|---|---|---|
| 5,950,767 A | * | 9/1999 | Kamani | .................. B66B 13/22 |
| | | | | 187/335 |
| 6,925,785 B1 | * | 8/2005 | Kawasaki | .............. A45C 13/10 |
| | | | | 292/57 |

(Continued)

FOREIGN PATENT DOCUMENTS

| | | | | |
|---|---|---|---|---|
| DE | 43 18 518 C1 | | 9/1994 | |
| DE | 19649593 A1 | * | 6/1998 | ................ F16P 3/08 |

(Continued)

*Primary Examiner* — Adnan Aziz
(74) *Attorney, Agent, or Firm* — Miller Johnson

(57) ABSTRACT

An access protection system for safeguarding an access point to a machine or installation includes a sensor device and an interlocking device. The sensor device includes an optical transmitter and receiver. The interlocking device includes a base body and a blocking element. The optical transmitter is configured to transmit a light pulse to the optical receiver. The sensor device is configured to generate a sensor signal based on reception of the light pulse. The sensor signal is used to control the machine or installation. The blocking element is movable relative to the base body from a release position into a blocking position. The blocking element is configured to be located, while in the blocking position, in a beam path of the light pulse between the optical transmitter and receiver to block the reception of the light pulse. The interlocking device is lockable in the blocking position by a securing element.

20 Claims, 11 Drawing Sheets

(56) References Cited

U.S. PATENT DOCUMENTS

| | | | |
|---|---|---|---|
| 2004/0061341 A1* | 4/2004 | Hodge | B65F 1/1615 292/336.3 |
| 2011/0049339 A1* | 3/2011 | Leeser | E05F 15/43 250/221 |
| 2011/0168517 A1* | 7/2011 | Krieger | E05C 3/14 192/135 |
| 2012/0038478 A1* | 2/2012 | Haviv | E05B 17/22 340/540 |
| 2012/0167646 A1* | 7/2012 | Sharma | G01D 5/268 70/280 |
| 2015/0275551 A1* | 10/2015 | Rink | E05B 47/0038 70/263 |
| 2017/0140595 A1 | 5/2017 | Kalous et al. | |
| 2021/0121930 A1* | 4/2021 | Denkmeier | B21D 5/04 |

FOREIGN PATENT DOCUMENTS

| | | |
|---|---|---|
| DE | 10 2012 111 433 A1 | 5/2014 |
| DE | 20 2014 105 201 U1 | 11/2014 |
| JP | 2000199599 A | 7/2000 |
| JP | 3929156 B2 | 6/2007 |

\* cited by examiner

ACCESS PROTECTION SYSTEM FOR SAFEGUARDING A MACHINE OR INSTALLATION

CROSS-REFERENCE TO RELATED APPLICATIONS

This application claims priority to German Application No. 10 2019 102 004.2 filed Jan. 28, 2019. The entire disclosure of the application referenced above is incorporated by reference.

FIELD

The present disclosure relates to an access protection system and a method for safeguarding an access point to a machine or installation located in a safety area.

BACKGROUND

Access protection systems and methods are generally known from the state of the art.

For example, DE 10 2012 111 433 A1 shows an optoelectronic protective device for safeguarding a hazardous area, with an optical transmitter and an optical receiver arranged at spatial distance from each other.

It is generally known that light curtains are used to protect access to hazardous areas or safety areas. In particular, they are used as non-separating protective devices at access points to hazardous areas. If a person or object is detected in the light curtain's detection range or interrupts the protective field, this is "signaled" by the light curtain, for example by switching off OSSD outputs on the light curtain.

After leaving the protective field, e.g. running out of the protective field and into the hazardous area, the system must remain in a safe state (OFF). This can be realized through a software interlock in the light curtain or in the safety controller. A restart is then only possible if a reset signal or restart signal is explicitly provided. It is important that a restart button for providing the reset signal is arranged in such a way that the hazardous zone is viewable and an operator can ensure that the system can restart safely.

In practice, the problem is that the restart button can be pressed to restart the system in an unauthorized case. In particular, this problem exists in case of a special operating mode of the system, in particular at maintenance, repair, commissioning or adjustment of the system. For example, in special mode, a second person can press the restart button while a first person is still in the hazardous area and covered by parts of the system and not visible from the outside. For example, the first person could be on the ground or inside the machine for repair or maintenance purposes.

It is also possible that the first person is no longer in the hazardous zone, but in the meantime another person has entered the hazardous area to search for the user, whereby the restart of the system is started by a third person or by the first person.

In the related art, solutions to the problem described above are known. These solutions propose to provide additional means to detect a person in the hazardous area. For example, separate electro-sensitive protective equipment can be used. These include in particular light grids in leveled or horizontal alignment, scanners in the hazardous area, additional safety mats or a safe camera system.

SUMMARY

The access protection system has a sensor device and a controller. The sensor device has an optical transmitter and an optical receiver. The optical transmitter is configured to send a light pulse to the optical receiver. The sensor device is configured to generate a sensor signal based on the reception of the light pulses by the receiver. The controller is configured to evaluate the sensor signal and to control the machine or installation located in the safety area based on the sensor signal.

It is an object of the present disclosure to provide an access protection system and methods with extended safety functions and increased protection against manipulation. In particular, it is an object of the present disclosure to provide an access protection system and method that continues to ensure high safety, requires less programming and wiring effort, is inexpensive and ecological in manufacture and application, and allows easy integration and handling.

According to a first aspect of the present disclosure, the access protection system described at the outset is further developed in that the access protection system additionally comprises an interlocking device having a base body and a blocking element arranged thereon. The blocking element is movable relatively to the base body from a release position into a blocking position in which the blocking element is arranged in a beam path of the light pulse between the transmitter and the receiver in order to block the reception of the light pulse. The interlocking device is lockable in the blocking position by a securing element.

According to a second aspect, a sensor device for safeguarding an access point to a machine or installation located in a safety area is proposed, comprising an optical transmitter and an optical receiver, wherein the optical transmitter is configured to transmit a light pulse to the optical receiver and the sensor device is configured to generate a sensor signal based on the reception of the light pulse by the receiver, based on which the machine or installation located in the safety area is controlled, in particular switched off, wherein an interlocking having a base body and a blocking element arranged thereon is arranged on the sensor device, wherein the blocking element is moveable relative to the base body from a release position into a blocking position in which the blocking element is arranged in a beam path of the light pulse between the transmitter and the receiver in order to block the reception of the light beam, and wherein the interlocking device can be locked in the blocking position by a securing element.

According to a third aspect of the present disclosure, an interlocking device is proposed for a sensor device which monitors an access point to a machine or installation located in a safety area and has an optical transmitter and an optical receiver which can be brought into interaction with each other by exchanging light pulses and thereby generate a sensor signal, wherein the interlocking device has a base body and a blocking element arranged thereon, wherein the blocking element can be brought relative to the base body from a release position into a blocking position in which the blocking element is arranged in a beam path of the light pulses between the transmitter and the receiver and prevents their interaction, and wherein the locking device is lockable in the blocking position by a securing element.

According to a fourth aspect of the present disclosure, a method is proposed for safeguarding an access point to a machine or installation located in a safety area. The method comprising the following steps:

providing a sensor device, said sensor device comprising an optical transmitter and an optical receiver;

transmitting a light pulse from the optical transmitter to the optical receiver;

generating a sensor signal by the sensor device based on the reception of the light pulse by the receiver;

evaluating the sensor signal by a controller;

controlling the machine or installation located in the safety area by the controller, while taking into account the sensor signal;

providing an interlocking device having a base body and a blocking element arranged thereon;

arranging the blocking element in a release position in which the blocking element is arranged outside a beam path of the light pulse between the transmitter and the receiver moving the blocking element from the release position to a blocking position in which the blocking element is located in a beam path of the light pulse between the transmitter and the receiver to block the reception of the light pulse; and locking of the interlocking in the locked position by a securing element.

The term "safety area" is to be understood as the area surrounding the installation or machine and which is safeguarded by the sensor device. The safety area can be a hazardous area in which persons are not allowed to be present during operation of the machine or installation, as the machine or installation, due to its automatic operation, represents a danger to persons who are present in the hazardous area.

The safety area, for example, can be understood as an essentially enclosed area that can only be accessed via an access point. The sensor device may be located at this access point for the purpose of access control. The safety area may also have two or more access points, each access point being separately safeguarded. For example, a sensor device can be provided for each access point.

By receiving the light pulse at the receiver, the sensor device can detect whether a person or an object is in the access point to the safety area or passes through the access point. If there is a person or object in the access point, reception of the light pulse is blocked, i.e. the light pulse does not reach the receiver. This allows the sensor device to determine whether a person or object is in the access point. The generated light pulse propagates along a beam path from the transmitter to the receiver. In other words, the light pulse forms a light beam along the beam path. The sensor device can also be configured to send several light pulses sequentially, i.e. with a time offset or at intervals.

The sensor device generates the sensor signal based on the reception of the light pulse. The sensor signal can, for example, contain information about whether the receiver has received a transmitted light pulse or not. The sensor signal can also contain information on whether a person or object has been detected in the access point.

It is an idea according to the present disclosure to provide an additional interlocking device by which the safety area can be safeguarded, especially in the case of the machine or installation being in special mode. In particular, it may be provided that the interlocking device safeguards the safety area for the entire duration of the machine or installation being in special mode. The interlocking device has a blocking element for this purpose. The blocking element can be placed in a beam path of the light pulse between the transmitter and receiver to block the reception of the light pulse. This can prevent unauthorized starting or independent start-up of the machine or installation, for example during special mode condition.

The blocking element is movable from the release position to the blocking position to safeguard the machine or installation. In the release position, the blocking element is located outside the beam path of the light pulse. In the blocking position, the blocking element is located within the beam path of the light pulse. The term "movable" here means that the position or orientation of the blocking element relative to the base body can be changed. For example, the blocking element can be rotated and/or moved relative to the base body. In particular, it may be provided that the blocking element is rotated about an axis of rotation or moved along a rail. For example, the base body can define the axis of rotation and/or the rail can be formed on it.

In addition, the interlocking device is lockable in the blocking position by the securing element. The term "lockable" is to be understood as meaning that means are provided to prevent the blocking element from moving out of the blocking position. The term "lockable" can mean in particular that it can be blocked. For example, a padlock may be provided as a means of locking. The padlock blocks or locks the blocking element in its blocking position.

By blocking the interlocking device by the securing element, it is achieved that the blocking element cannot be moved from the blocking position to the release position without releasing the blocking provided by the securing element. In other words, a user must perform a conscious action to enable the restart of the machine or installation. This prevents, for example, that a third party can unintentionally restart the machine or installation as long as a user is in the safety area during special mode. The mechanical design also makes it difficult to manipulate the blocking device.

By this inventive configuration, a cost-effective and simple alternative to the protective devices proposed in the related art is provided. Since the interlocking device operates purely mechanically, no additional programming or wiring is required, while still ensuring a high level of safety and protection against manipulation.

The interlocking device is ecological in its production and use. Furthermore, the interlocking device is easy to integrate, especially in existing systems, and easy to handle.

In a first refinement, it may be provided that the blocking element is mechanically pivotable relative to the base body from the release position to the blocking position in a rotational direction about a pivot axis.

In principle, it is also conceivable that the blocking element is moved from the release position to the blocking position by a linear displacement instead of by pivoting. The blocking element can be moved and pivoted either automatically at the push of a button, for example by an electric motor, or mechanically by hand. Mechanical pivoting by hand is a simple and cost-effective solution. The blocking element may be pivoted by 90° to move it from the release position to its blocking position or vice versa. Accordingly, the longitudinal direction of the blocking element in the blocking position encloses an angle of preferably 90° with longitudinal direction in the release position.

In a further refinement it may be provided that the pivot axis is arranged parallel or perpendicular to the beam path of the light pulse.

If the pivot axis is parallel to the beam path of the light pulse, the blocking element is rotated about the pivot axis into the beam path of the light pulse. The pivot axis may extend away from the base body. If the pivot axis is arranged perpendicular to the beam path of the light pulse, the blocking element is tilted around the pivot axis into the beam path of the light pulse. The pivot axis may be arranged parallel to or along the base body. The arrangement of the pivot axis depends in the specific application on the available installation space, since the blocking element in the release position extends from the base body in different directions depending on the arrangement of the pivot axis.

In a further refinement it may be provided that the securing element is configured to connect the base body and the blocking element in the blocking position in a rotationally fixed manner in the direction of rotation.

This prevents the blocking element from being movable out of the blocking position relative to the base body.

In a further refinement it may be provided that a handle is provided on the blocking element for pivoting the blocking element about the pivot axis by hand, in particular wherein the handle extends substantially parallel to the pivot axis, in particular substantially along the pivot axis.

With the help of this handle, the blocking element can be turned or pivoted relatively easily. This handle can also be ergonomically shaped for easy and comfortable handling. By attaching the handle along the swivel axis of the locking lever, the force required for pivoting or rotating can be transferred very easily to the blocking element. The blocking element itself may be plate-shaped, so that in the blocking position it can be arranged over as large an area as possible in the beam path of the light pulse between the transmitter and the receiver.

In a further refinement it may be provided that the blocking element is coupled to the base body via a spring element arranged along the pivot axis, which in the release position and/or in the blocking position exerts a spring force which presses the blocking element against the base body.

For example, a mechanical compression spring can be used as a spring element. In principle, however, a pneumatic or hydraulic spring element would also be conceivable. The main purpose of the spring force exerted by the spring element on the blocking element is to prevent unintentional release of the blocking element from its release position and/or from its blocking position. It presses the blocking element against the body of the interlocking device. In order to be able to pivot the blocking element from the blocking position to the release position or vice versa, the operator must therefore first slightly lift the blocking element against the effect of the spring force. The spring force exerted by the spring element should therefore not be too great.

In a further refinement, it may be provided that the blocking element is latchable to the base body in the release position and/or in the blocking position.

The blocking element may be latchable to the base body both in the release position and in the blocking position. In addition to the above-mentioned spring element, such a latching of the blocking element offers protection against unintentional pivoting of the blocking element out of the blocking position or the release position. The positions of the blocking element in the release position and the blocking position are also exactly defined. This simplifies handling for the operator.

In a further refinement it may be provided that a first and a second recess are provided on the base body, wherein the blocking element is locked in the release position by arrangement in the first recess and is locked in the blocking position by arrangement in the second recess.

These recesses allow a mechanically simple and yet stable locking of the blocking element. Especially in combination with the spring element already mentioned above, the blocking element is pulled into the respective recess so to speak automatically due to the spring force when the blocking position or the release position is reached. Disengaging the latching can then be achieved by lifting the blocking element against the spring force. The two recesses provided in the base body may be arranged orthogonally to each other.

In a further refinement, it may be provided that the interlocking device further comprises a receptacle for the securing element, wherein the securing element, inserted into the receptacle, holds the blocking element in its blocking position, in particular wherein the securing element is lockable.

This allows the blocking element to be easily locked in its blocking position. The securing element may be designed as a padlock. A shackle of the padlock can then be passed through the receptacle of the blocking element to lock the blocking element in the blocking position.

In a further embodiment, it may be provided that the receptacle for the lockable securing element is designed as a hole in the blocking element.

A padlock used as a lockable securing element can thus be inserted directly into the hole provided in the blocking element. The hole may only be accessible when the blocking element is in the blocking position. A padlock can therefore only be attached to the interlocking device when the blocking element is in the blocking position. Incidentally, the position of the hole should also be selected so that the blocking element cannot be moved or pivoted from the blocking position to the release position when a padlock is inserted into the hole. This is prevented by the padlock colliding with the base body of the interlocking device when an attempt is made to swing the lever. For this purpose, the aforementioned hole may be located in the area of one end of the plate-shaped blocking element.

In a further refinement it may be provided that a recess is provided on the base body which, in the blocking position of the blocking element, is at least partially aligned with the hole provided in the blocking element.

This recess can be either a hole or a kind of notch in the base body. The fact that this recess is aligned with the hole provided in the blocking element in the blocking position means that when a padlock is inserted in the hole, a kind of form fit is created between the shackle of the padlock and the hole in the blocking element as well as the recess in the base body. In the locked position of the blocking element, the padlock is therefore not only inserted into the hole of the blocking element, but also into the recess of the base body. If the hole and recess are exactly above each other in the blocking position, it is no longer possible to pivot the blocking element with the padlock inserted without destroying the padlock or the interlocking device. The additional safety provided by the interlocking device can thus not be manipulated unintentionally.

In a further refinement it may be provided that two holes are provided in the blocking element as receptacles for a lockable securing element in each case and two recesses are provided on the base body, which in the blocking position of the blocking element are at least partially aligned with the holes provided in the blocking element, wherein the securing elements, when inserted into the respective receptacle, hold the blocking element in its blocking position.

According to this refinement, the locking lever has, so to speak, two slots for one padlock each. Such a refinement is particularly advantageous if there are several operators of the machine or installation. When entering the safety area, a first operator secures the access protection system with a first padlock. If a second person then enters the safety area, this person can also secure the blocking element in the blocking position by inserting or hooking a second padlock into the second hole of the blocking element. If the first operator then leaves the safety area again, he immediately recognizes, due to the second padlock, that there is another person in the safety area. The two operators can therefore only jointly move the blocking element to its release position by releasing both padlocks from the blocking element. This would ensure that even if there were two operators, neither of them would be in the safety area when the machine or installation is put back into operation. It goes without saying that, depending on the number of potential operators, more than two holes or receptacles for padlocks may of course be provided on the interlocking device.

In a further embodiment it may be provided that the base body is arranged on the transmitter or on the receiver, in particular wherein the base body is rigidly connectable to the transmitter or the receiver.

In other words, the base body is thus arranged on the transmitter or receiver side. Due to the rigid connection with the transmitter or the receiver, the blocking element is especially movable relative to the transmitter or receiver, i.e. relative to the beam path of the light pulse. The transmitter and/or receiver may be located on opposite sides of the access point. It may be provided that there is a bar on each side of the access point, with the transmitter and receiver each located in one of the bars. The base body of the interlocking device can be mounted either directly or via a coupling element on one of the bars.

In a further refinement, it may be provided that the sensor device comprises a plurality of optical transmitters and corresponding optical receivers, wherein the blocking element in its blocking position being arranged in at least two beam paths of the light pulses between the transmitters and the receivers.

The large number of transmitters and receivers are provided for improved safety of the access point against entering the safety area. Blocking two beam paths has the advantage that redundant safety is provided in the event of a fault. For example, a blocked receiver could erroneously detect a light signal even though the blocking element blocks a corresponding beam path. Furthermore, a blocked receiver could also transmit a wrong signal to the controller due to a defect or manipulation.

It is understood that the features mentioned above and those to be explained below can be used not only in the combination indicated in each case, but also in other combinations or in a stand-alone situation, without leaving the scope of the present invention.

BRIEF DESCRIPTION OF THE DRAWINGS

Embodiments of the invention are shown in the drawings and are explained in more detail in the following description.

DETAILED DESCRIPTION

Figure 1:
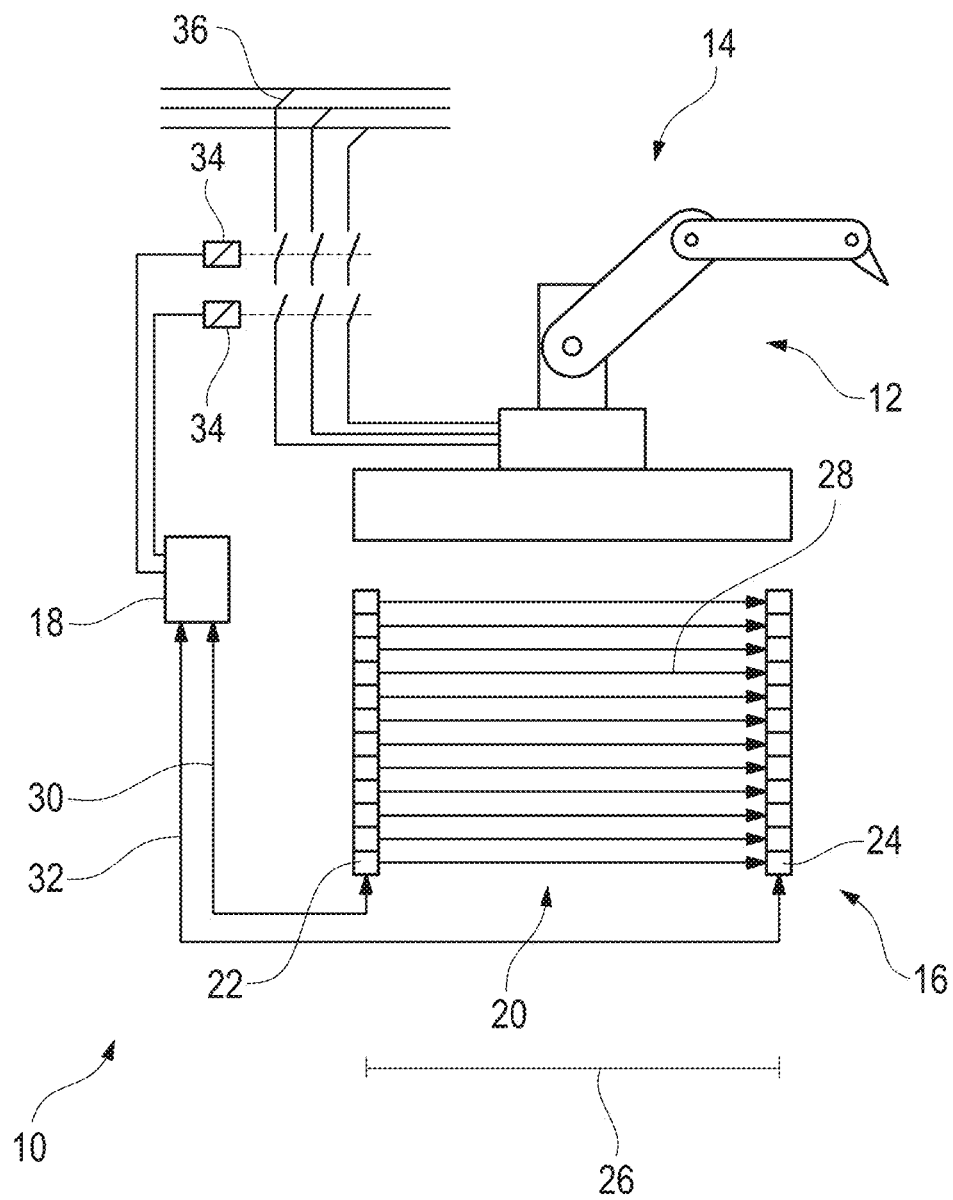
FIG. 1 is a schematic view of a first embodiment of an access protection system.

FIGS. 1 and 2 show a first embodiment of an access protection system 10. FIG. 1 shows the basic design of the access protection system 10. FIG. 2 shows a detailed view of the access protection system 10, in which an interlocking mechanism for additional safety of the access protection system 10 is shown.

The access protection system 10 is designed to safeguard an installation or machine 14 located in a safety area 12. An access point 20 to the safety area 12 is monitored by the access protection system 10. If a person enters the safety area 12, this is detected by the access protection system 10 and the installation or machine 14 located in the safety area 12 is transferred to a state which is safe for the person. For example, the installation or machine 14 can be switched off, especially by interrupting the power supply.

The access protection system 10 has a sensor device 16. The sensor device 16 is located at the access point 20 to the safety area 12. The sensor device 16 has an optical transmitter 22 and an optical receiver 24. The optical transmitter 22 and the optical receiver 24 are located at a distance 26 from each other. The transmitter 22 and the receiver 24 may be located on opposite sides of the access point 20. The optical transmitter 22 generates a light pulse and sends it along a beam path 28 to the optical receiver 24, in other words, the light pulse forms a light beam along beam path 28. The sensor device 16 is configured to generate a sensor signal based on the reception of the light pulse by the receiver 24. The sensor signal thus contains the information whether the light pulse has reached receiver 24. The optical transmitter 22 may generate light pulses at time intervals and sends them along a beam path 28 to the optical receiver 24.

The sensor device 16 can have a plurality of optical transmitters 22 and corresponding optical receivers 24. The plurality of transmitters 22 and the plurality of receivers 24 can each be arranged in a bar. The two bars can be arranged on opposite sides of access point 20. Each transmitter 22 sends a light pulse along a beam path 28 to the corresponding receiver 24. In other words, the light pulses form light beams between the respective transmitters 22 and receivers 24. The individual light beams span a so-called light grid between transmitter 22 and receiver 24. The light grid is arranged in the access point to the safety area 12 in such a manner that a person entering the safety area briefly interrupts at least one light beam, i.e. the line of sight between a transmitter 22 and the associated receiver 24 is interrupted as long as the person between transmitter 22 and receiver 24 is in the access point 20. The sensor device 16 can generate a separate sensor signal for each transmitter-receiver pair. Alternatively, the sensor device 16 can generate a sensor signal containing the information whether a receiver 24 of the multitude of receivers has not received the corresponding light pulse.

The access protection system 10 also has a controller 18. The controller 18 can be connected to the optical transmitter 22 via a line 30 and to the optical receiver 24 via a line 32. If there is a plurality of transmitters 22 and receivers 24, a line 30, 32 can be provided for each transmitter 22 and receiver 24. Alternatively, a line 30 can be provided for all transmitters 22 and a line 32 for all receivers.

The controller 18 is configured to evaluate the sensor signal and to control the installation or machine 14 located in the safety area 12 based on the sensor signal. For example, controller 18 can stop the system or machine 14 if a light pulse has been blocked. Alternatively, the controller 18 can transfer the installation or machine 14 into a safe state.

For example, to stop the installation or machine 14, the controller 18 can interrupt the power supply 36 to the installation or machine 14. For this purpose the controller 18 is connected to contactors 34, which are arranged in the electrical circuit between the power supply 36 and the installation or machine 14. If a light beam is interrupted, the controller 18, with the aid of the contactors 34, interrupts the power supply 36 to the installation or machine 14, thus bringing the installation or machine 14 to a standstill. In this exemplary embodiment, the control of the contactors 34 is designed redundantly in accordance with the current safety standards.

The controller 18 can control the optical transmitter 22. For example, it may be provided that the controller 18 generates a test signal and sends it to the optical transmitter(s) 22. The transmitter(s) 22 transmit the test signal to the receiver(s) 24 using the respective pulsed light beam, e.g. the test signal can be modulated onto the respective pulsed light beam. The receiver(s) 24 receive the test signal and send it back to the controller 18, which compares the received test signal with the original test signal.

If a person now enters the safety area, a pulsed light beam is briefly interrupted so that the test signal does not reach a receiver 24 or does not reach it completely. If an incomplete signal is returned by a receiver 24, the controller 18 detects this when comparing the outgoing signal with the incoming signal and then disconnects the power supply 36 to the installation or machine 14 with the contactors 34.

Alternatively, the generation and evaluation of the test signal can be performed in the sensor device. The sensor signal then only contains the information whether a light beam of a transmitter-receiver pair has been interrupted.

The access protection system 10 also has an interlocking device 40 as shown in FIG. 2. The interlocking device 40 is an additional mechanical component that can be located at or in the access point 20 of safety area 12. The interlocking device 40 forms an additional interlocking mechanism for additional safety of the access protection system 10. For example, the interlocking mechanism can be used to safeguard the safety area 12 in a special operating mode of the installation or machine 14.

Figure 2A:
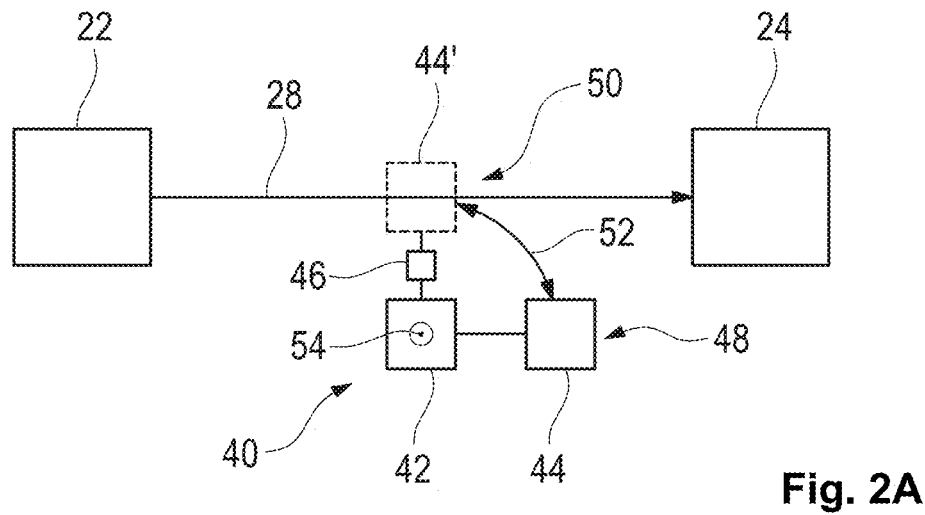
FIG. 2A is a detailed view of an example implementation of the access protection system of FIG. 1.
Figure 2B:
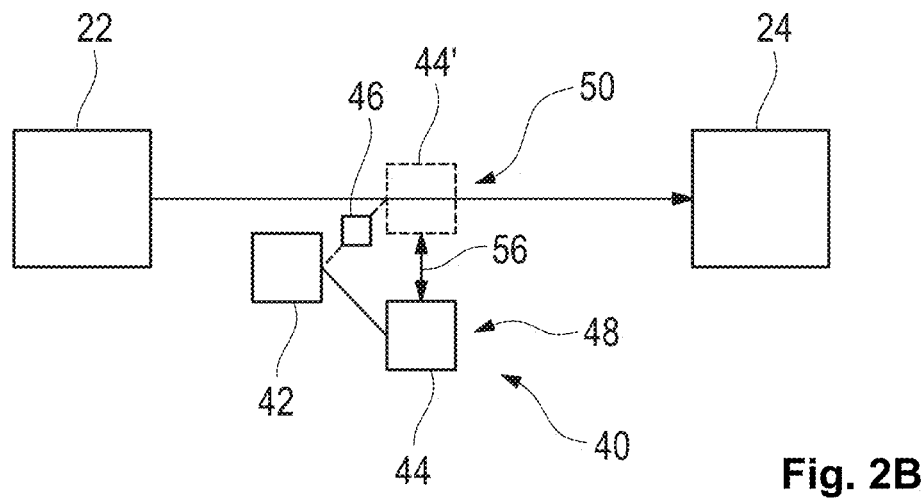
FIG. 2B is a detailed view of an example implementation of the access protection system of FIG. 1.

FIGS. 2A and 2B show two embodiments of the interlocking device 40. The embodiments have essentially the same components and differ essentially only in the different movement of the locking mechanism.

The interlocking device 40 in both embodiment has a base body 42 and a blocking element 44. The blocking element 44 is arranged, in particular movable, on the base body 42. The base body 42 is located at the access point 20 to the safety area 12. In particular, the base body 42 is located outside a beam path 28 of the light pulse between the transmitter 22 and the receiver 24. The base body 42 can be arranged on the transmitter 22 or the receiver 24, i.e. on the transmitter side or the receiver side. In particular, the base body 42 can be rigidly connected to the transmitter 22 or the receiver 24. In other embodiments, the relative position of the base body 42 with respect to the transmitter 22 and/or the receiver 24 may be fixed.

The blocking element 44 is movable relatively to the base body 42 between a release position 48 and a blocking position 50. In particular, the blocking element 44 is movable relatively to the base body 42 from the release position 48 to the blocking position 50 or from the blocking position 50 to the release position 48. In the release position 48 the blocking element 44 is located outside a beam path 28 of the light pulse between the transmitter 22 and the receiver 24. In the blocking position 50 the blocking element 44 is located in a beam path 28 of the light pulse between the transmitter 22 and the receiver 24. In this way the blocking element 44 in the blocking position 50 blocks the light pulse between transmitter 22 and receiver 24. In other words, the blocking element 44 in blocking position 50 blocks the reception of the light pulse.

In the case of a plurality of transmitters 22 and corresponding receivers 24, the blocking element 44 may be configured in such a way that in the blocking position 50 it is arranged between the transmitters and receivers in at least two beam paths 28 of the light pulses.

Furthermore, a securing element 46 may be provided by which the interlocking device 40 is lockable in the locked position 50. If the blocking element 44 is blocked in the blocking position 50, the blocking element 44 cannot be moved relatively to the base body 42. Only by disengaging the locking, the blocking element 44 can be moved again relatively to the base body 42. The securing element 46 can, for example, be designed as a lockable securing element 46, especially as a padlock.

The blocking element 44 is moveable between the release position and the blocking position, for example, by a linear movement, in particular by shifting in a thrust direction, or by a rotational movement, in particular by pivoting in a rotational direction about a pivot axis.

In FIG. 2A, the blocking element 44 is movable between the release position 48 and the blocking position 50 by a rotational movement. The blocking element 44 is rotatable in a rotational direction 52 around a pivot axis 54 between the release position 48 and the blocking position 50. In other words, the blocking element 44 can be pivoted relative to the base body 42 from the release position 48 to the blocking position 50 in the rotational direction 52 about the pivot axis 54. For this purpose, the blocking element 44 can, for example, be rotatably mounted on the base body 42. In particular, the base body may have a pin or a rod which serves as a pivot axis for the blocking element 44.

In principle, the pivot axis 54 encloses an angle with the beam path 28 of the light pulse which lies between 0° and 180°. The pivot axis 54 may be arranged parallel or perpendicular to the beam path 28 of the light pulse. In FIG. 2A, the pivot axis 54 is arranged perpendicular to the beam path 28 of the light pulse.

The securing element 46 in this embodiment can be designed to connect the base body 42 and the blocking element 44 in the blocking position 50 in the rotational direction 52 in a rotationally fixed manner.

In embodiment (B) of FIG. 2, the blocking element 44 is movable by a linear movement between the release position 48 and blocking position 50. The blocking element 44 is slidable in a linear thrust direction 56 between the release position 48 and the blocking position 50. For this purpose, the base body 42 can, for example, have a rail along which the blocking element 44 can be shifted in the thrust direction 56.

Figure 3:
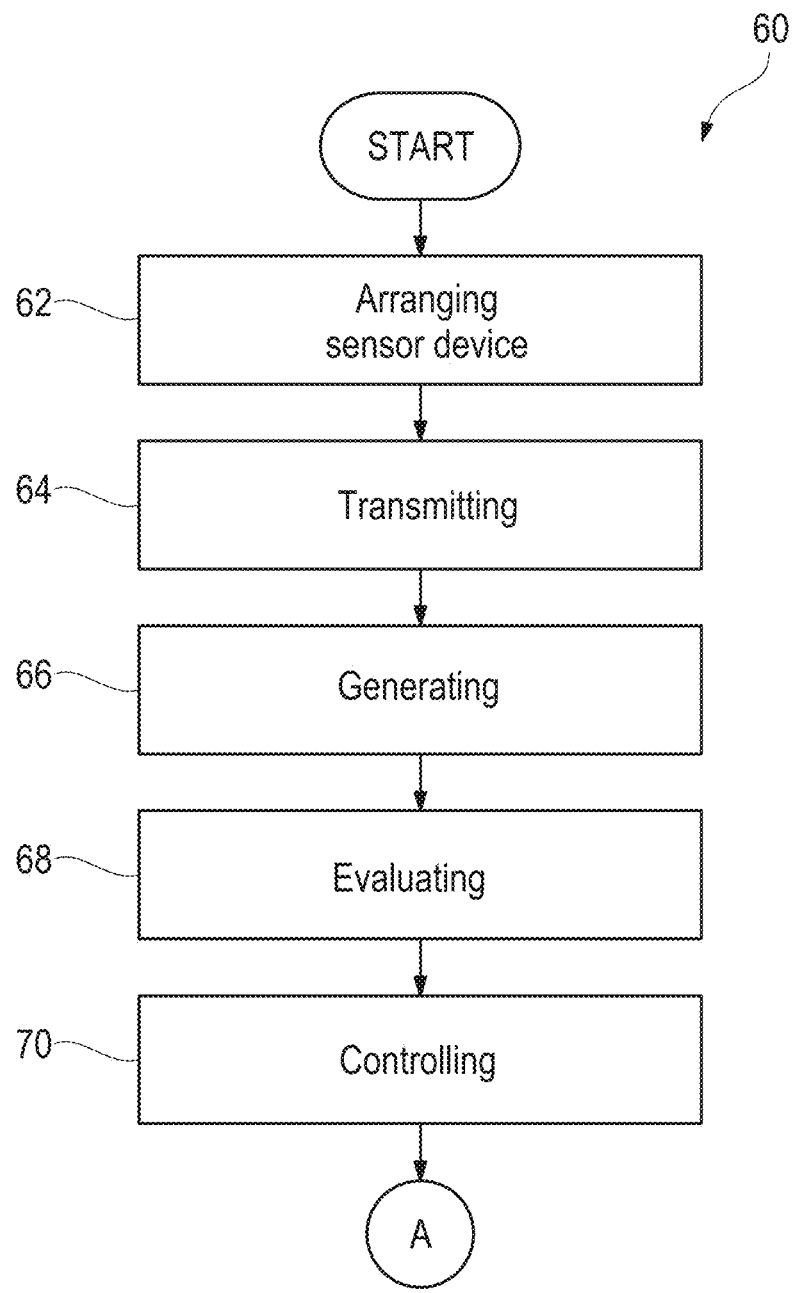
FIG. 3 is a schematic view of a first part of an embodiment of a method for safeguarding a machine or installation located in a safety area.
Figure 4:
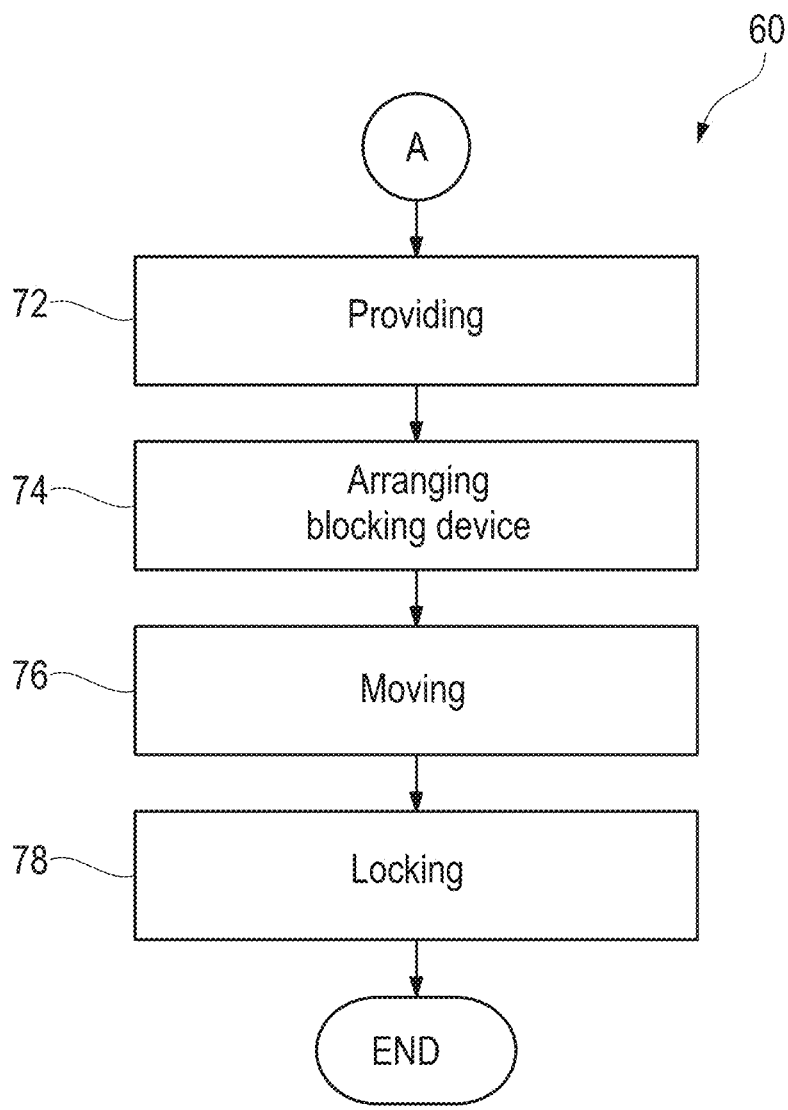
FIG. 4 is a schematic view of a second part of the method of FIG. 3.
Figure 5:
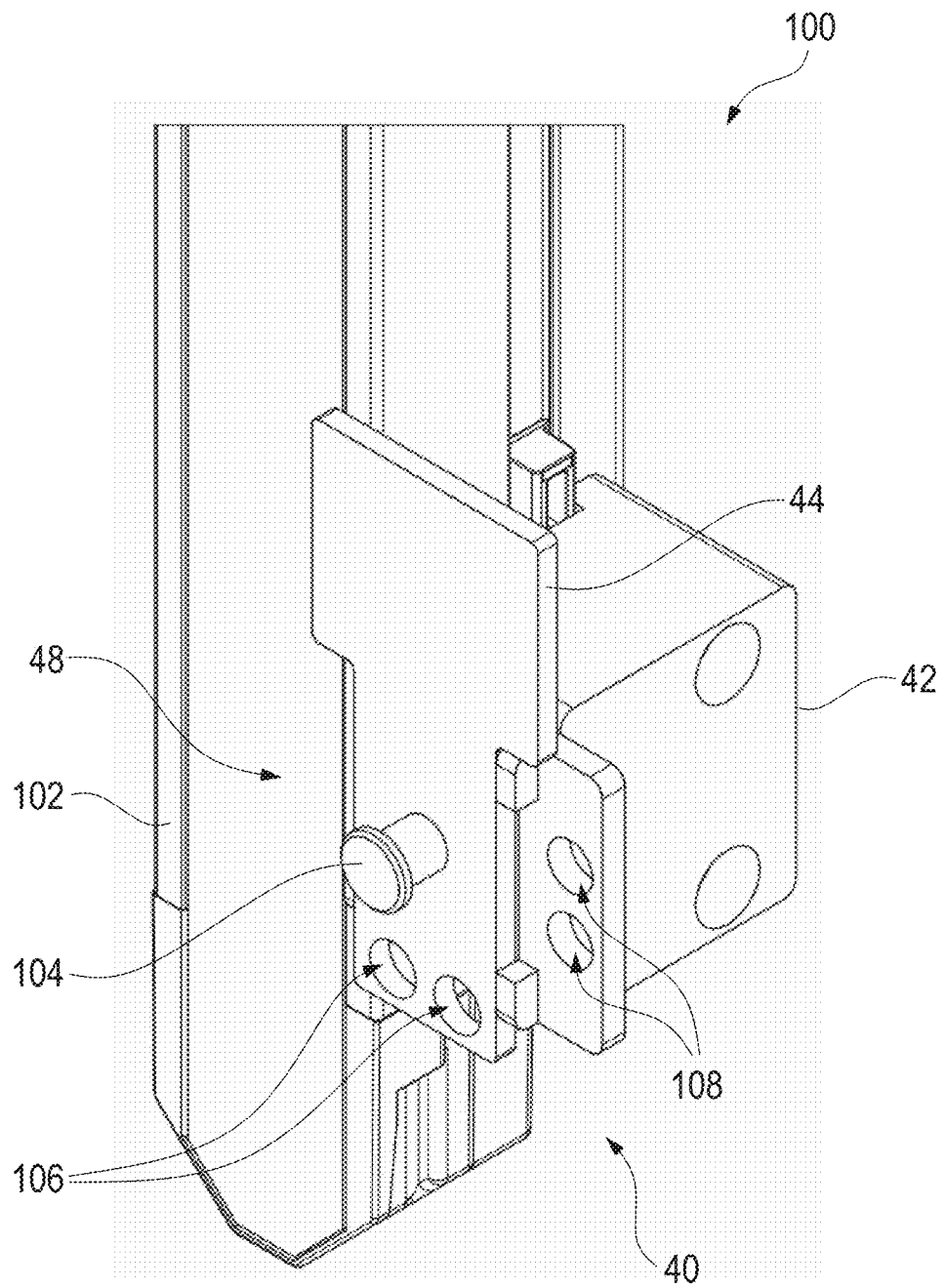
FIG. 5 is a perspective view of a second embodiment of an access protection system in the release position
Figure 6:
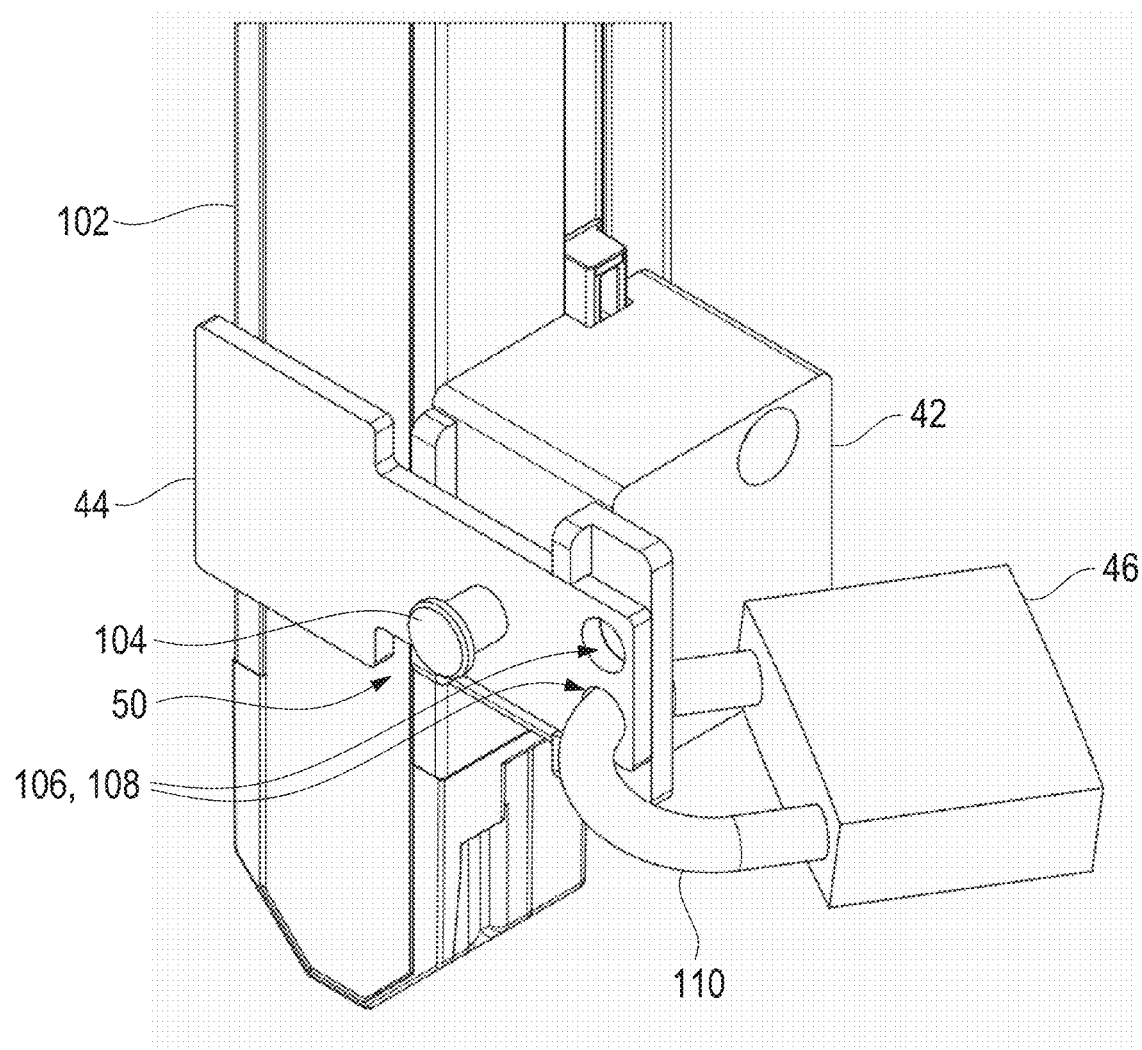
FIG. 6 is a perspective view of the access protection system of FIG. 5 in the blocking position.
Figure 7:
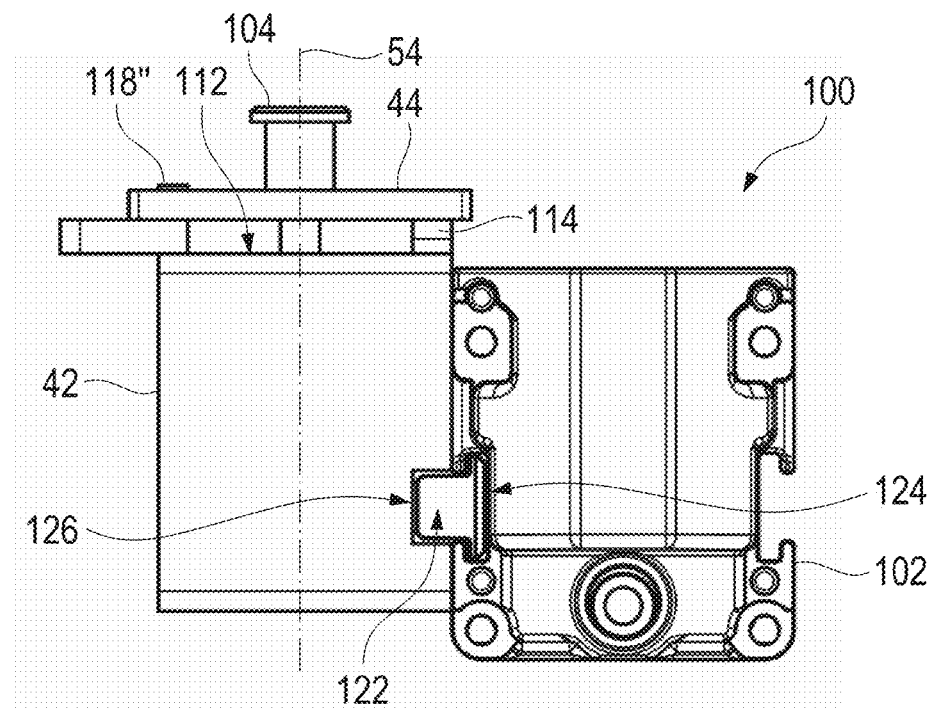
FIG. 7 is a first side view of the access protection system of FIG. 5.
Figure 8:
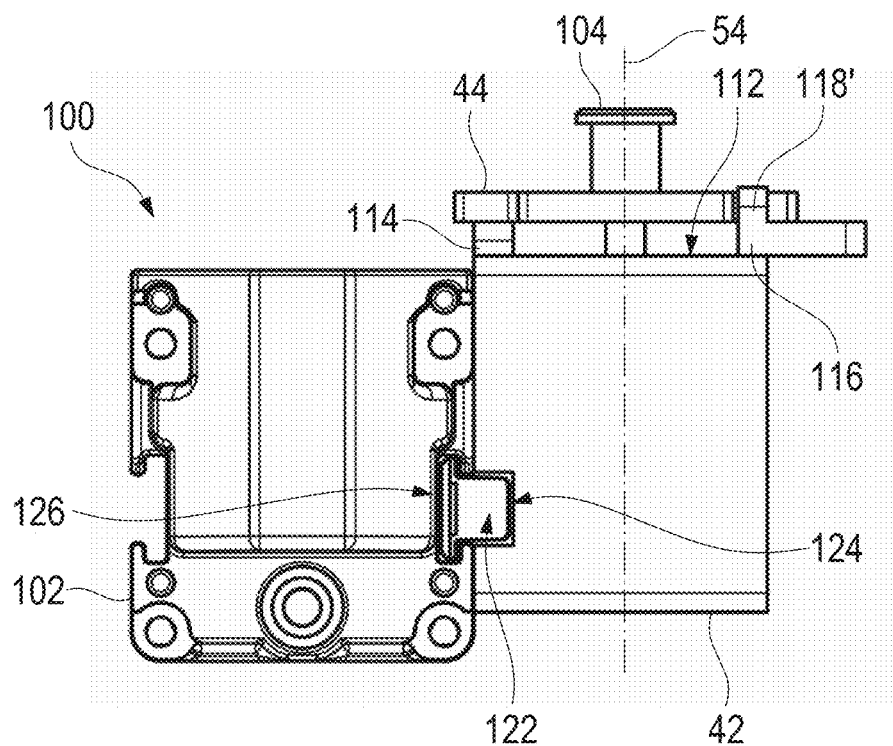
FIG. 8 is a second side view of the access protection system of FIG. 5.
Figure 9:
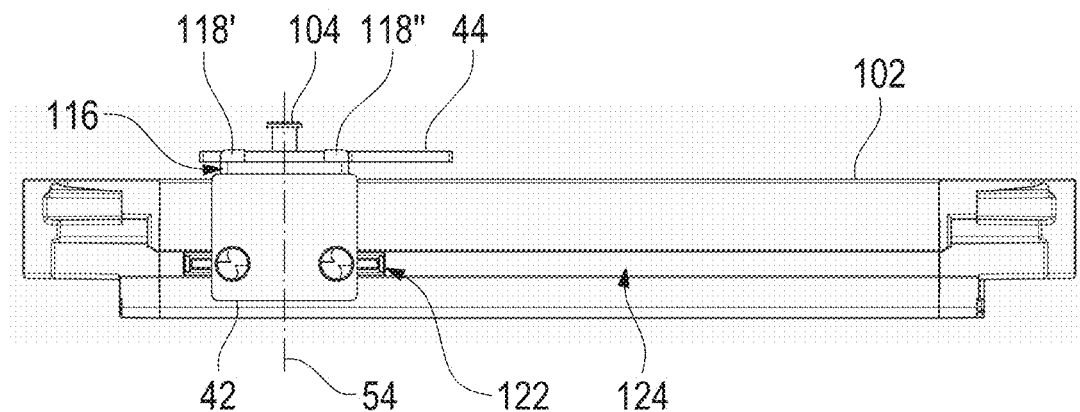
FIG. 9 is a front view of the access protection system of FIG. 5.
Figure 10:
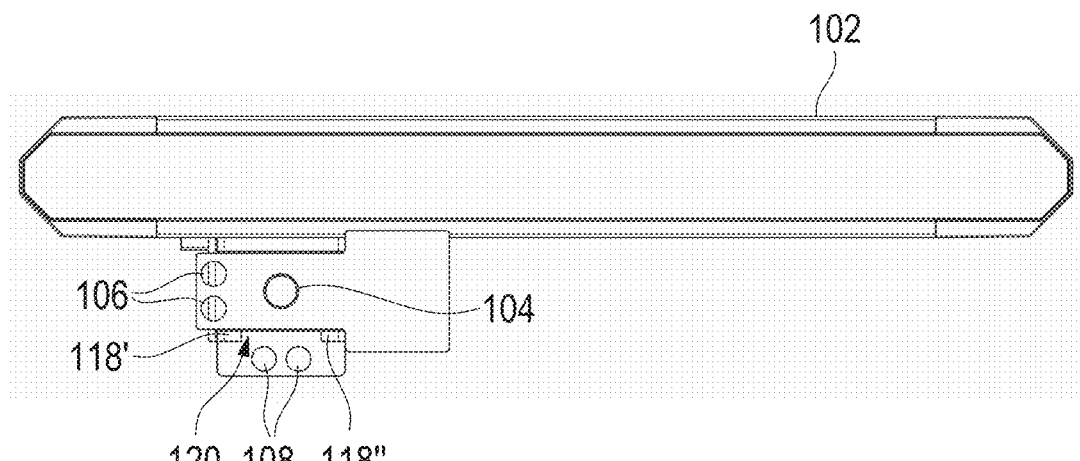
FIG. 10 is a top view of the access protection system of FIG. 5.
Figure 11:
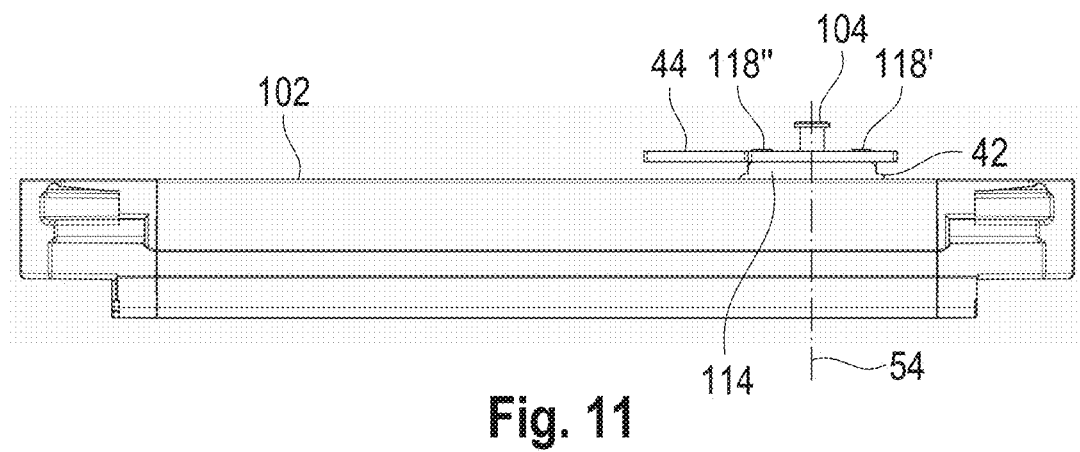
FIG. 11 is a rear view of the access protection system of FIG. 5.
Figure 12:
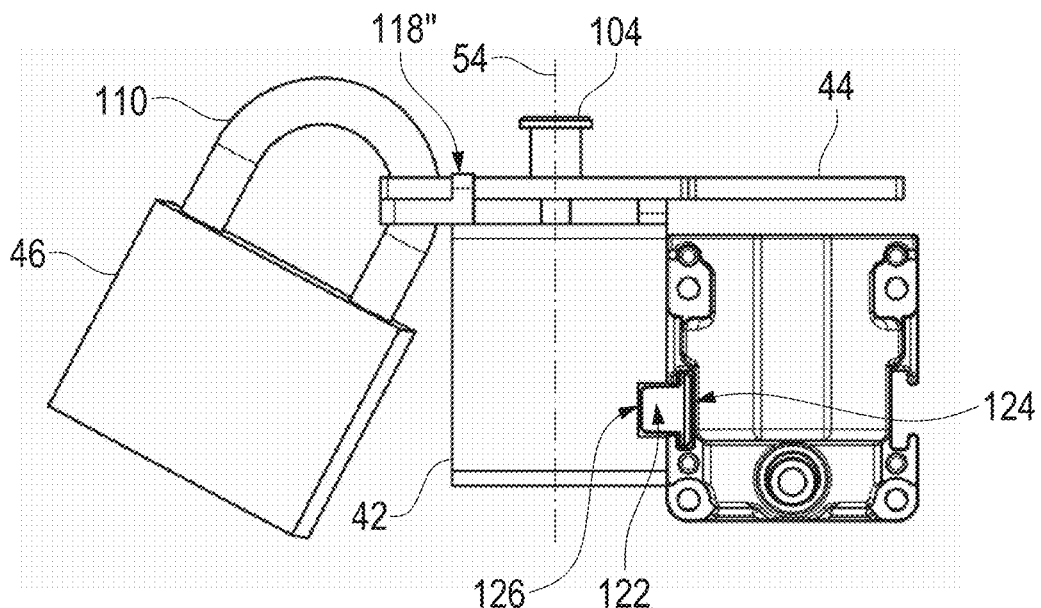
FIG. 12 is a first side view of the access protection system of FIG. 6.
Figure 13:
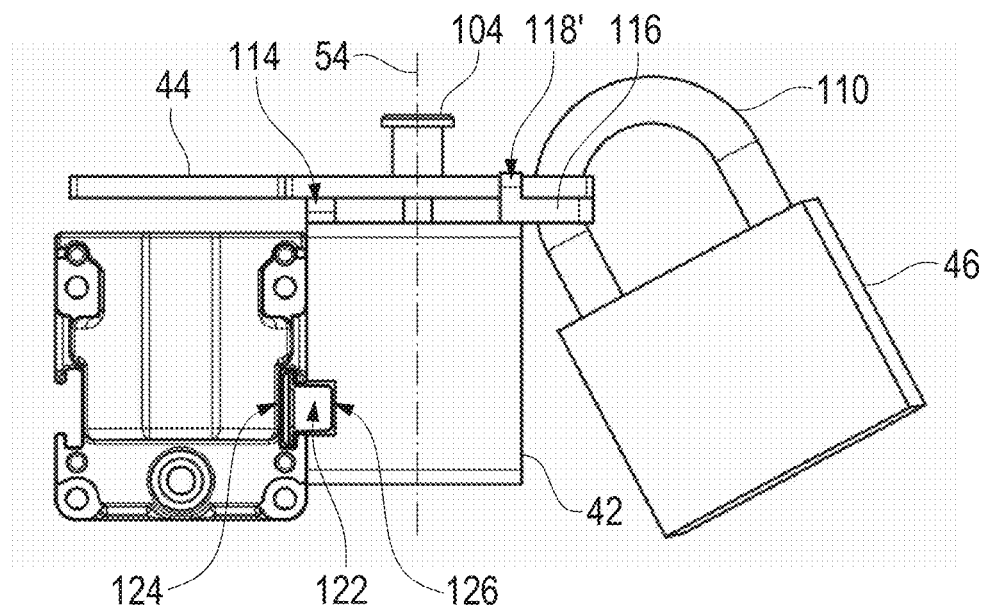
FIG. 13 is a second side view of the access protection system of FIG. 6.
Figure 14:
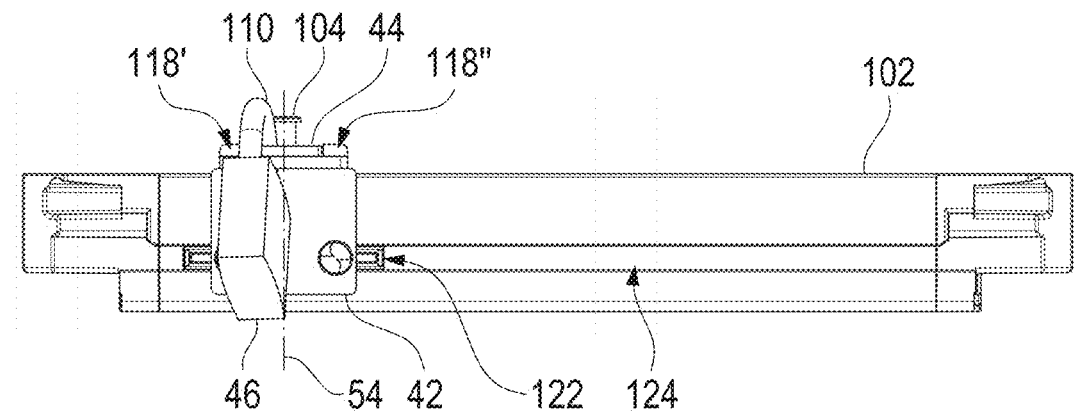
FIG. 14 is a front view of the access protection system of FIG. 6.
Figure 15:
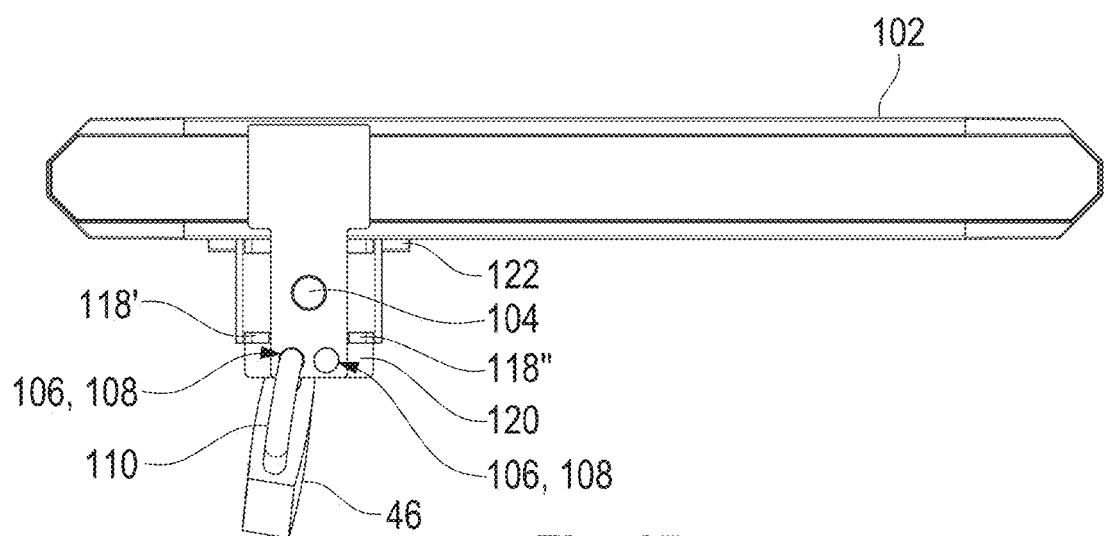
FIG. 15 is a top view of the access protection system of FIG. 6.
Figure 16:
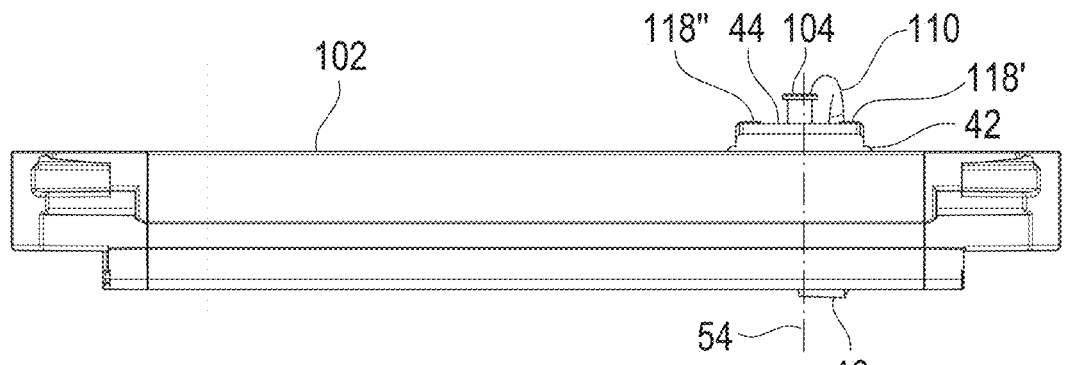
FIG. 16 is a rear view of the access protection system of FIG. 6.

FIGS. 3 and 4 show an embodiment of a method 60 for safeguarding a machine or installation 14 located in a safety area 12. The method 60 describes the function of the access protection system 10 of FIGS. 1 and 2.

In a first step 62 of method 60, the sensor device 16 is provided.

In a further step 64 of the method 60, a light pulse is sent from the optical transmitter 22 to the optical receiver 24.

In a further step 66 of the method 60 a sensor signal is generated by the sensor device 16 based on the reception of the light pulse by the receiver 24.

In a further step 68 of procedure 60, the sensor signal is evaluated by the controller 18.

In a further step 70 of the method 60 the machine or installation 14 located in the safety area 12 is controlled by the controller 18 taking into account the sensor signal.

In a further step 72 of the method 60, the interlocking device 40 is provided with the base body 42 and the blocking element 44 arranged on it.

In a further step 74 of the method 60, the blocking element 44 is arranged in the release position 48, in which the blocking element 44 is arranged outside a beam path 28 of the light pulse between the transmitter 22 and the receiver 24.

In a further step 76 of the method 60, the blocking element 44 is moved from the release position 48 to the blocking position 50, in which the blocking element 44 is arranged in a beam path 28 of the light pulse between the transmitter 22 and the receiver 24 to block the reception of the light pulse.

In a further step 78 of the method 60, the interlocking device 40 is blocked in the blocking position 50 by a securing element 46.

In the step of locking 78, a lockable securing element 46 may be inserted into a receptacle of the interlocking device 40 to hold the blocking element 44 in its blocking position 50.

FIGS. 5 to 16 show a second embodiment of an access protection system 100. The access protection system 100 has essentially the same components as the access protection system 10 of FIGS. 1 and 2. The same components are therefore denoted with the same reference signs and are not explained in detail.

FIGS. 5 and 7 to 11 show different views of the access protection system 100 in a release state in which the blocking element 44 is arranged in release position 48. FIGS. 6 and 12 to 16 show different views of the access protection system 100 in which the blocking element 44 is arranged in blocking position 50.

The access protection system 100 comprises a bar 102 in which one or more transmitters 22 or one or more receivers 24 are arranged. The bar 102 thus forms a housing for the transmitters 22 or the receivers 24, and the bar 102 can be located on one side of access 20.

In addition, the access protection system 100 has a coupling element 122 which rigidly connects the bar 102 and the base body 42. For this purpose, the bar 102 has a first groove 124, which extends in the direction in which the bar 102 extends. The direction of extension of the first groove may be perpendicular to the beam path 28 of the light pulse and the pivot axis 54. The base body 42 has a second groove which extends in the same direction of extension. The coupling element 122 also extends in the direction of extension and engages in both the first groove and the second groove to rigidly connect the base body 42 and the bar 102.

Alternatively or in addition, the base body 42 can also be attached to the bar 102 by further fasteners, for example one or more screws.

The blocking element 44 in the embodiment of FIGS. 5 to 16, as in FIG. 2A, is mounted on the base body 42 so that it can rotate or pivot about a pivot axis 54. In contrast to FIG. 2A, the pivot axis 54 runs parallel to a light path 28 of the light pulse of the sensor device 16.

The access protection system 100 further comprises a handle 104 to enable the blocking element 44 to be pivoted by hand in relation to the base body 42. In principle, a pivot movement of the blocking element 44 driven by an actuator is also conceivable. However, pivoting the blocking element 44 by hand offers easy handling and also saves costs for actuators that would otherwise have to be provided separately. The handle 104 shown here may run along or parallel to the pivot axis 54, around which the blocking element 44 can be pivoted.

The blocking element can be coupled to the base body 42 via a spring element (not shown) arranged along the pivot axis 54. This spring element can exert a spring force that presses the blocking element 44 against the top of the base body 44. Additional spacers may be provided for stabilization.

The interlocking device 40 may also have a receptacle for the securing element 46. When the securing element 46 is inserted into the receptacle, the blocking element 44 is held in its blocking position 50. The security element 46 in the present embodiment is designed as a padlock. The securing element has a shackle 110 and is lockable, i.e. the shackle 110 can be locked against a base body of the securing element.

The blocking element 44 can also have a hole 106 for the securing element 46. The hole 106 forms the receptacle of the interlocking device 40. So as soon as the operator has moved the blocking element 44 to the blocking position 50, he can additionally insert the shackle 110 of the securing element 46 into the hole 106. It is then no longer possible to pivot the blocking element 44 out of its blocking position 50. If an attempt were made to pivot the blocking element 44, the securing element 46 collides with the base body 42 of the interlocking device 48, so that the locking lever 52 is blocked in its blocking position 50.

Furthermore, the base body 42 can have a recess 108 which, in the blocking position 50 of the blocking element 44, is at least partially aligned with the hole 106 of the blocking element 44. The recess 108 of the base body 42 can also be designed as a hole. To lock the interlocking device 40, the shackle 110 of the securing element 46 can then be passed through the hole 106 and the recess 108 to connect the base body 42 and the blocking element 44 in the rotational direction 52 about the pivot axis 54 in a rotationally fixed manner in order to hold the blocking element 44 in the blocking position 50.

In the present embodiment of FIGS. 5 to 16, the blocking element 44 has two holes 106 as a receptacle for a lockable securing element 46. Two holes have the advantage that several (two) padlocks can be inserted. In this way each operator can insert his personal padlock into one of the two holes.

Accordingly, the base body 42 can also have two recesses 108, which in the blocking position 50 of the blocking element 44 are at least partially aligned with the holes 106 provided in the blocking element 44. These recesses 108 can in principle also be designed as holes. They offer further mechanical protection, which prevents the blocking element 44 from pivoting out of its blocking position 50 when the padlock is inserted. Since the recesses 108 can be exactly aligned with the holes 106, when a padlock is inserted into one of the two openings, a form fit is created between the shackle 110 of the padlock and the respective hole 106 or recess 108.

The blocking element 44 can be latched to the base body 42 both in the release position 48 and in the blocking position 50. For this purpose, the base body 42 has two recesses 112, 120 on its upper side, in which the blocking element 44 can be flush mounted. This creates a kind of form fit between the blocking element 44 and the recesses 112 or 120. The first recess 112 is assigned to the release position 48. The second recess 120 is assigned to the blocking position 50. Both recesses 112, 120 are laterally limited by two webs. The webs serve as lateral walls which prevent the blocking element 44 from slipping or pivoting in the release position 48 or in the blocking position 50. The base body 42 has a first web 114 and a second web 116, which serve as lateral walls of the first recess 112. The second web 116 also has two lugs 118', 118", which are designed as webs and serve as lateral walls of the second recess 120. The first and second recesses 112, 120 may be arranged at an angle of 90° to each other.

In order to pivot the blocking element 44 from the release position 48 to the blocking position 50 or from the blocking position 50 to the release position 48, the blocking element 44 must be pulled upwards, i.e. away from the base body 42, along the pivot axis 54 over the webs 114, 116, 118', 118" using the handle 104. Doing so, the operator has to overcome the spring force exerted by the spring element. Only then, the blocking element 44 can be pivoted into the other position.

Figure 17:
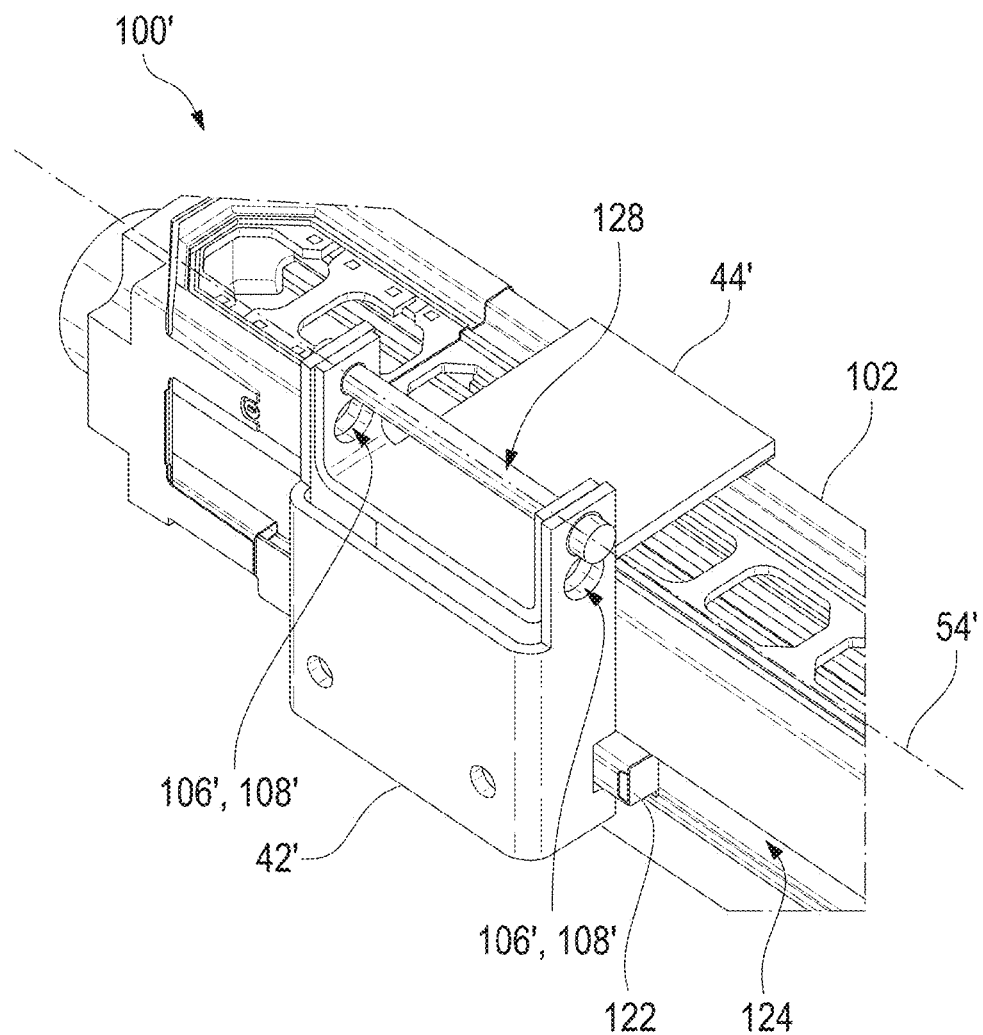
FIG. 17 is a perspective view of a third embodiment of an access protection system.

FIG. 17 shows a third version of an access protection system 100'. The access protection system 100' is shown in the blocking state in which the blocking element 44' is arranged in blocking position 50. The access protection system 100' comprises essentially the same components as the access protection system 100, which is shown in FIGS. 5 to 16. The same components are therefore denoted with the same reference signs and are not explained in detail.

The access protection system 100' differs from the access protection system 100 in that the pivot axis 54' of the interlocking device 40' is not parallel but perpendicular to a beam path 28 of the light pulse of the sensor device 16. In particular, the pivot axis 54' runs parallel to the direction in which the bar 102 extends, so that the blocking element 44' is rotated or tilted around the pivot axis 54' between the release position 48 and the blocking position 50. For this purpose, the base body 42' has a pin or rod 128, which is arranged along the pivot axis 54'. The blocking element 44' is rotatably mounted on the base body 42' using the pin or rod 128.

The blocking element 44' again has two holes 106' and the base body 42' has corresponding recesses 108' which are aligned with the holes 106' in the blocking position 50. The recesses 108' are also designed as holes. In the blocking position 50, a securing element 46 can be passed through the holes 106' and the recesses 108' to block the blocking element 44' in the blocking position 50.

The phrase at least one of A, B, and C should be construed to mean a logical (A OR B OR C), using a non-exclusive logical OR, and should not be construed to mean "at least one of A, at least one of B, and at least one of C."

What is claimed is:

1. An access protection system for safeguarding an access point to a machine or installation located in a safety area, the access protection system comprising:
    a sensor device including (i) an optical transmitter arranged on a first housing located at a first side of the access point and (ii) an optical receiver arranged on a second housing located at a second side of the access point and
    an interlocking device including a base body and a blocking element arranged on the base body,
    wherein:
    the optical transmitter is configured to transmit a light pulse to the optical receiver,
    the sensor device is configured to generate a sensor signal based on reception of the light pulse by the optical receiver,
    the sensor signal is used to control the machine or installation,
    the blocking element is movable relative to the base body from a release position into a blocking position,
    the blocking element is configured to be located, while in the blocking position, in a beam path of the light pulse between the optical transmitter and the optical receiver in order to block the reception of the light pulse,
    the interlocking device is lockable in the blocking position by a securing element,
    one of the first housing and the second housing extends in a first direction and has a groove that extends in the first direction, and
    the base body of the interlocking device is connected to the groove by a coupling element.

2. The access protection system of claim 1, further comprising a controller configured to evaluate the sensor signal and control the machine or installation based on the sensor signal.

3. The access protection system of claim 2, wherein the controller is configured to switch the machine or installation to an off state based on the sensor signal.

4. The access protection system of claim 1, wherein the blocking element is mechanically pivotable relative to the base body from the release position into the blocking position in a rotational direction about a pivot axis.

5. The access protection system of claim 4, wherein the pivot axis is arranged parallel or perpendicular to the beam path of the light pulse.

6. The access protection system of claim 4, wherein the securing element is configured to connect the base body and the blocking element to one another in a rotationally fixed manner in the rotational direction in the blocking position.

7. The access protection system of claim 4, wherein:
    the blocking element includes a handle to allow pivoting the blocking element about the pivot axis by hand and
    the handle extends substantially parallel to the pivot axis and substantially along the pivot axis.

8. The access protection system of claim 4, wherein:
    the blocking element is coupled to the base body via a spring element arranged along the pivot axis and
    the spring element is configured to, when the blocking element is in at least one of the release position and the blocking position:
    exert a spring force and
    press the blocking element against the base body.

9. The access protection system of claim 1, wherein the blocking element, when in at least one of the release position and the blocking position, is latchable to the base body.

10. The access protection system of claim 9, wherein:
the base body includes a first recess and a second recess;
the blocking element is lockable in the release position by arrangement in the first recess; and
the blocking element is lockable in the blocking position by arrangement in the second recess.

11. The access protection system of claim 1, wherein:
the interlocking device includes a receptacle for the securing element;
the securing element is lockable; and
the securing element is configured to, while inserted into the receptacle, hold the blocking element in the blocking position.

12. The access protection system of claim 11, wherein the receptacle for the securing element is configured as a hole in the blocking element.

13. The access protection system of claim 12, wherein:
the base body includes a recess and
the recess is configured to, while the blocking element is in the blocking position, at least partially align with the hole in the blocking element.

14. The access protection system of claim 1, wherein:
the blocking element includes two holes;
each of the two holes is configured as a receptacle for a lockable securing element;
the base body includes two recesses;
while the blocking element is in the blocking position, the two recesses of the base body at least partially align with the two holes of the blocking element; and
while the lockable securing elements are inserted into the two holes of the blocking element, the blocking element is holdable in the blocking position by the lockable securing elements.

15. The access protection system of claim 1, wherein:
the base body is rigidly connectable to at least one of the optical transmitter and the optical receiver and
the base body is arranged on at least one of the optical transmitter and the optical receiver.

16. The access protection system of claim 1, wherein:
the sensor device includes a plurality of optical transmitters and corresponding optical receivers;
each of the plurality of optical transmitters is configured to transmit a respective light pulse to the corresponding optical receiver; and
the blocking element is arranged, while in the blocking position, in at least two beam paths of the light pulses between the plurality of optical transmitters and the corresponding optical receivers.

17. The access protection system of claim 1 wherein the first housing and the second housing are spaced apart on opposite sides of the access point.

18. The access protection system of claim 1 wherein the first direction is perpendicular to the beam path of the light pulse.

19. An interlocking device for a sensor device configured to monitor an access point to a machine or installation arranged in a safety area, the sensor device having an optical transmitter and an optical receiver configured to interact with one another by exchanging light pulses and the sensor device being configured, based on the exchange, to generate a sensor signal, the interlocking device comprising:
a base body,
a blocking element arranged on the base body, and
a coupling element,
wherein:
the blocking element is moveable relative to the base body from a release position into a blocking position,
the blocking element is arranged, while in the blocking position, in a beam path of the light pulses exchanged between the optical transmitter and the optical receiver,
the blocking element is configured to, while in the blocking position, prevent the interaction of the optical transmitter and the optical receiver,
the interlocking device is lockable in the blocking position by a securing element,
at least one of the optical transmitter and the optical receiver is arranged in a bar-shaped housing having a groove that extends in a direction perpendicular to the beam path, and
the coupling element is configured to engage the groove to couple the base body of the interlocking device to the bar-shaped housing.

20. A method for safeguarding an access point to a machine or installation located in a safety area, the method comprising:
arranging an optical transmitter in a first housing located at a first side of the access point;
arranging an optical receiver in a second housing located at a second side of the access point, wherein one of the first housing and the second housing extends in a first direction and has a groove that extends in the first direction;
transmitting a light pulse from the optical transmitter to the optical receiver;
generating a sensor signal based on reception of the light pulse by the optical receiver;
evaluating, by a controller, the sensor signal;
controlling, by the controller, the machine or installation based on the evaluation of the sensor signal;
connecting a base body of an interlocking device to the groove using a coupling element;
arranging a blocking element of the interlocking device in a release position in which the blocking element is arranged outside a beam path of the light pulse between the optical transmitter and the optical receiver;
moving the blocking element from the release position to a blocking position in which the blocking element is located in the beam path of the light pulse between the optical transmitter and the optical receiver to block the reception of the light pulse; and
locking, by a securing element, the blocking element in the blocking position.

* * * * *